(12) United States Patent
Yagyu et al.

(10) Patent No.: US 7,388,474 B2
(45) Date of Patent: Jun. 17, 2008

(54) VEHICULAR OBSTACLE DETECTION SYSTEM

(75) Inventors: Hiroshi Yagyu, Tsushima (JP); Kenichiro Horikawa, Obu (JP); Hideyuki Ide, Toyota (JP); Kenichi Ohue, Toyota (JP)

(73) Assignee: DENSO CORPORATION, Kariya (JP)

( * ) Notice: Subject to any disclaimer, the term of this patent is extended or adjusted under 35 U.S.C. 154(b) by 137 days.

(21) Appl. No.: 11/049,300

(22) Filed: Feb. 3, 2005

(65) Prior Publication Data
US 2005/0190048 A1 Sep. 1, 2005

(30) Foreign Application Priority Data
Feb. 5, 2004 (JP) ............... 2004-029338

(51) Int. Cl.
*B60Q 1/00* (2006.01)
*G08B 3/00* (2006.01)
*G08G 1/00* (2006.01)

(52) U.S. Cl. ............ 340/435; 340/436; 340/901; 340/902; 340/328; 701/301

(58) Field of Classification Search ............ None
See application file for complete search history.

(56) References Cited

U.S. PATENT DOCUMENTS 5,173,881 A 12/1992 Sindle
6,097,285 A 8/2000 Curtin
6,169,478 B1 * 1/2001 Hada et al. ............ 340/435
6,522,245 B1 2/2003 Kondo et al.
7,042,344 B2 * 5/2006 Chiba et al. ........... 340/435
2004/0239490 A1 * 12/2004 Chiba et al. ........... 340/435
2005/0001715 A1 * 1/2005 Itoh et al. .............. 340/435

FOREIGN PATENT DOCUMENTS

JP A-10-319120 12/1998

OTHER PUBLICATIONS

First Office Action from Chinese Patent Office issued on Jun. 9, 2006 for the corresponding Chinese patent application No. 2005100067553.

* cited by examiner

*Primary Examiner*—Julie Bichngoc Lieu
(74) *Attorney, Agent, or Firm*—Posz Law Group, PLC (57) ABSTRACT

When either a front-side sensor or a rear-side sensor of a subject vehicle detects an obstacle entering a certain distance range of multiple distance ranges within a detection zone close to the subject vehicle, a micro-computer causes a warning unit to warn with a buzzer in a primary warning pattern that is prepared for each distance range. In contrast, when both detect obstacles, the warning unit is caused to warn in the following patterns. In a first case that at least one of two sensors detects an obstacle entering a shortest distance range, the warning unit warns in a different warning pattern differentiated from the primary warning pattern. In a second case except the first case, the warning unit warns in the primary warning pattern corresponding to the distance range that is entered by the obstacle that is closer to the vehicle, of the obstacles detected by the two sensors.

5 Claims, 8 Drawing Sheets

| FRONT SENSOR (Sf1, Sf2) / REAR SENSOR (Sr1, Sr2, Sb1, Sb2) | SHORT RANGE Zs3 | MIDDLE RANGE Zs2 | LONG RANGE Zs1 | NO DETECTION |
|---|---|---|---|---|
| SHORT RANGE Zs3 | (f) | (e) | (e) | (d) CONTINUOUS SOUND |
| MIDDLE RANGE Zs2 | (e) | (c) 0.075-s CYCLE | (c) 0.075-s CYCLE | (c) 0.075-s CYCLE |
| LONG RANGE Zs1 | (e) | (c) 0.075-s CYCLE | (b) 0.15-s CYCLE | (b) 0.15-s CYCLE |
| NO DETECTION | (d) CONTINUOUS SOUND | (c) 0.075-s CYCLE | (b) 0.15-s CYCLE | (a) NO SOUND |

BOTH DETECTED / SINGLE DETECTED

| FRONT SENSOR (Sf1, Sf2) / REAR SENSOR (Sr1, Sr2, Sb1, Sb2) | SHORT RANGE Zs3 | MIDDLE RANGE Zs2 | LONG RANGE Zs1 | NO DETECTION |
|---|---|---|---|---|
| SHORT RANGE Zs3 | (f) | (e) | (e) | (d) CONTINUOUS SOUND |
| MIDDLE RANGE Zs2 | (e) | (c) 0.075-s CYCLE | (c) 0.075-s CYCLE | (c) 0.075-s CYCLE |
| LONG RANGE Zs1 | (e) | (c) 0.075-s CYCLE | (b) 0.15-s CYCLE | (b) 0.15-s CYCLE |
| NO DETECTION | (d) CONTINUOUS SOUND | (c) 0.075-s CYCLE | (b) 0.15-s CYCLE | (a) NO SOUND |

BOTH DETECTED

SINGLE DETECTED

| REAR SENSOR (103, 104) \ FRONT SENSOR (101, 102) | SHORT RANGE | MIDDLE RANGE | LONG RANGE | NO DETECTION |
|---|---|---|---|---|
| SHORT RANGE | (d) CONTINUOUS SOUND | (d) CONTINUOUS SOUND | (d) CONTINUOUS SOUND | (d) CONTINUOUS SOUND |
| MIDDLE RANGE | (d) CONTINUOUS SOUND | (c) 0.075-s CYCLE | (c) 0.075-s CYCLE | (c) 0.075-s CYCLE |
| LONG RANGE | (d) CONTINUOUS SOUND | (c) 0.075-s CYCLE | (b) 0.15-s CYCLE | (b) 0.15-s CYCLE |
| NO DETECTION | (d) CONTINUOUS SOUND | (c) 0.075-s CYCLE | (b) 0.15-s CYCLE | (a) NO SOUND |

BOTH DETECTED

SINGLE DETECTED

VEHICULAR OBSTACLE DETECTION SYSTEM

CROSS REFERENCE TO RELATED APPLICATIONS

This application is based on and incorporates herein by reference Japanese Patent Application No. 2004-29338 filed on Feb. 5, 2004.

FIELD OF THE INVENTION

The present invention relates to a vehicular obstacle detection system.

BACKGROUND OF THE INVENTION

Figure 5:
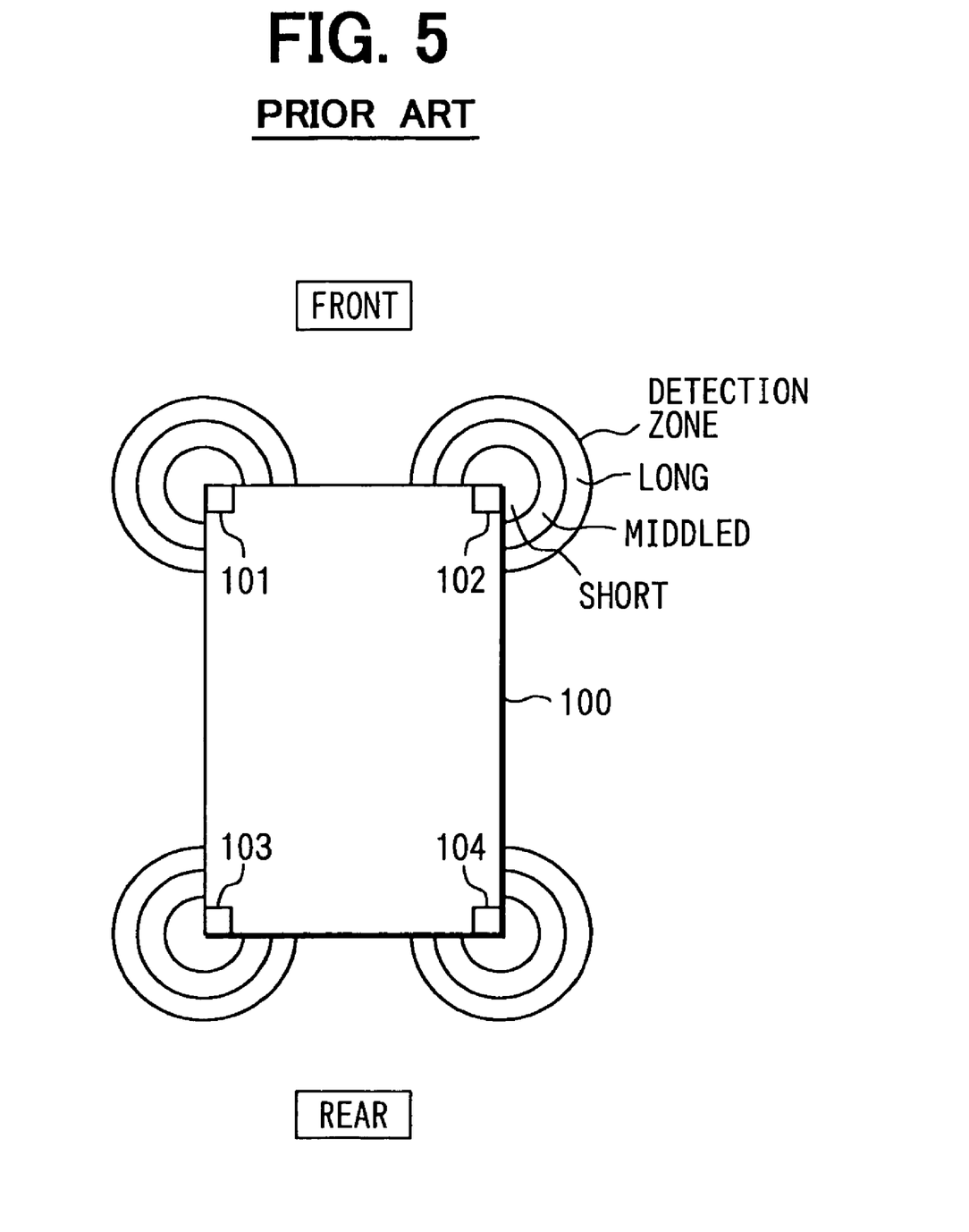
FIG. 5 is a layout diagram of sensors in a vehicular obstacle detection system of a prior art.
Figure 6:
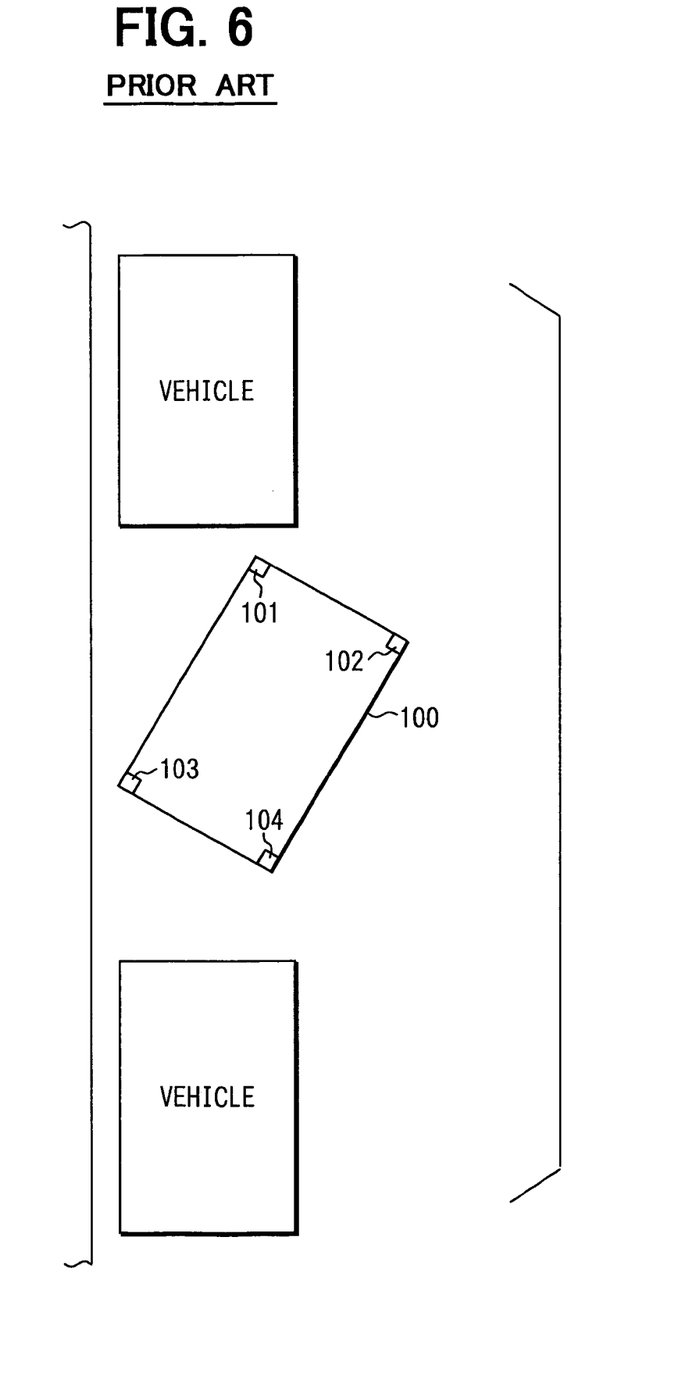
FIG. 6 is a plan view showing a use state of the vehicular obstacle detection system of the prior art.

There is known an obstacle detection system that causes a distance sensor to detect an obstacle approaching a vehicle to then warn an occupant of the vehicle of the obstacle approaching. For instance, as shown in FIG. 5, a vehicle is provided with distance sensors 101 to 104 at four corners of the vehicle, each of which has a detection zone including a short range, a middle range, and a long range. The vehicle is further provided with a first buzzer corresponding to the front-side sensors 101, 102 and a second buzzer corresponding to the rear-side sensors 103, 104. The first and second buzzers output sounds whose frequencies are different from each other, which enables determination whether an obstacle is present in a vicinity to the front corner of the vehicle or to the rear corner of the vehicle. For instance, as shown in FIG. 6, when a vehicle 100 is parallel parked, a left front sensor 101 and a left rear sensor 103 detect obstacles. In this case, the distinction between the two locations can be possible.

Figure 7:
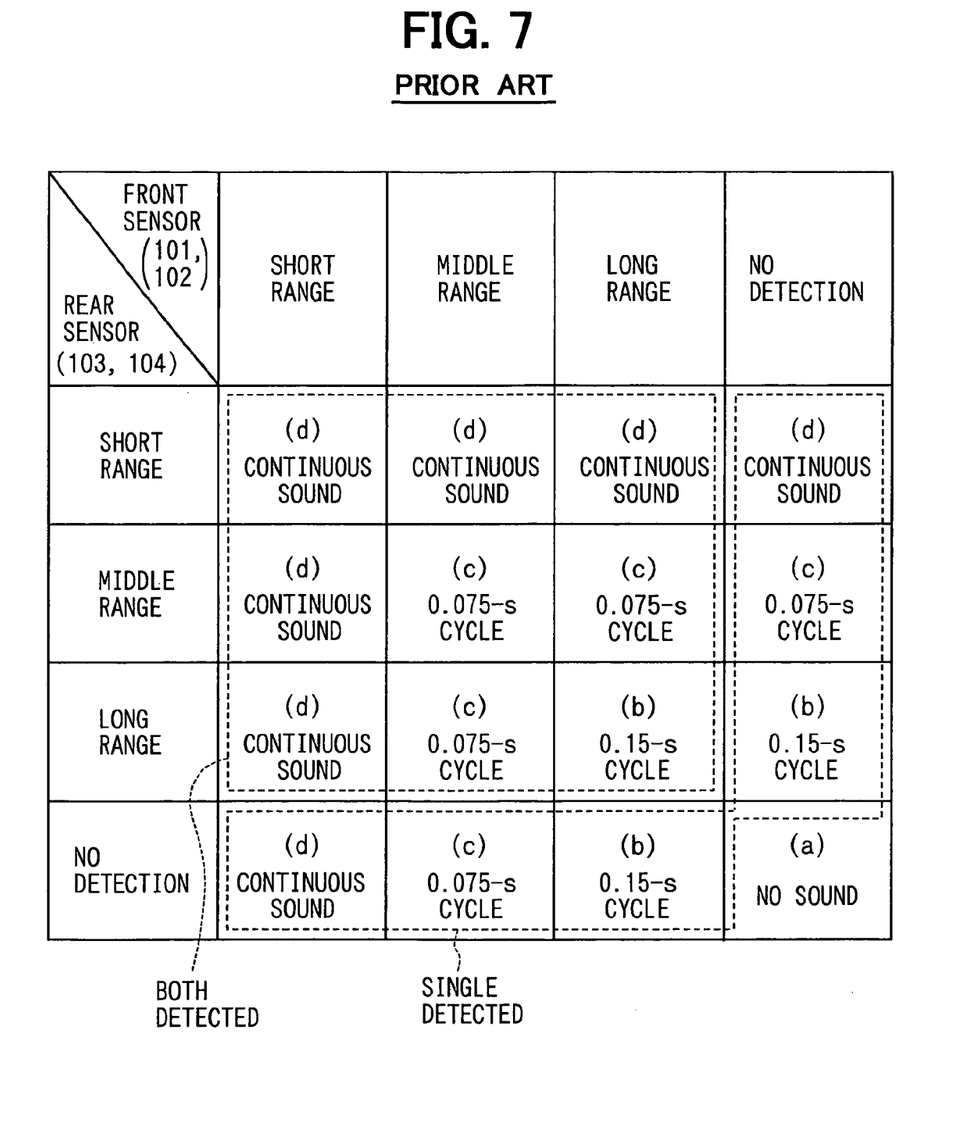
FIG. 7 is a diagram showing a combination of output patterns of a warning sound by a buzzer of the prior art.
Figure 8:
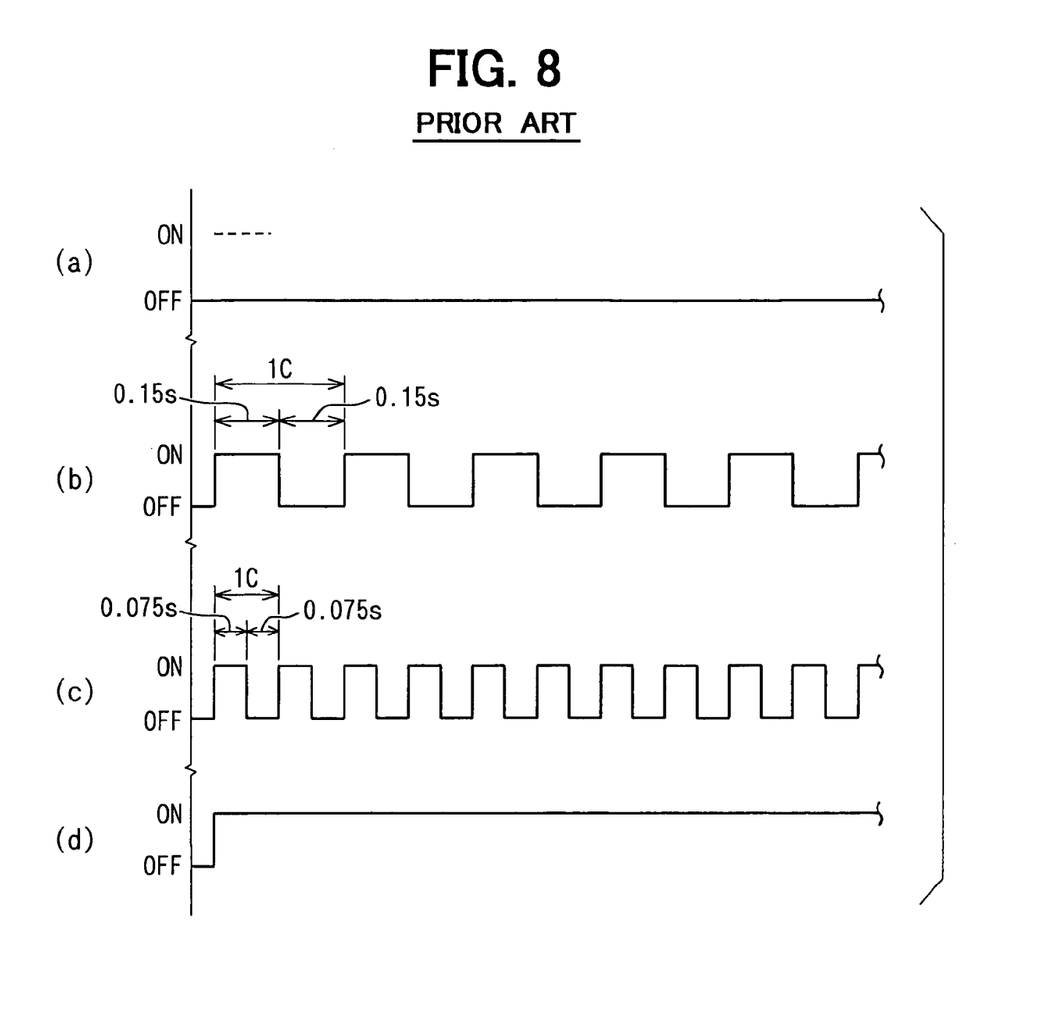
FIG. 8 is a time chart diagram showing a pattern of each warning sound used in the vehicle obstacle detection system of the prior art.

Under this obstacle detection system, when the number of buzzers is changed from two to one, the following problem occurs. FIG. 7 shows a combination of output patterns of a warning sound by the buzzer. The line shows each case where an obstacle is detected by the front-side sensors 101, 102 in a short range, in a middle range, or in a long range of the detection zone, or where no obstacle is detected. Similarly, the column shows each case where an obstacle is detected by the rear-side sensors 103, 104 in a short range, in a middle range, or in a long range of the detection zone, or where no obstacle is detected. Here, when both sensors do not detect an obstacle, the buzzer is being off so that no sound is outputted, as shown in (a) in FIG. 8. In contrast, when either sensor detects an obstacle, the buzzer is repeatedly turned on and off according to a distance. That is, the buzzer is repeatedly turned on and off with 0.15-second intervals in the long distance, as shown in (b) in FIG. 8; the buzzer is repeatedly turned on and off with 0.075-second intervals in the middle range, as shown in (c) in FIG. 8; and the buzzer is continuously turned on (or outputs a continuous sound) in the short range as shown in (d) in FIG. 8.

On the other hand, when both sensors detect obstacles, the buzzer is controlled as follows. In a case where one of the front-side sensor 101, 102 or the rear-side sensor 103, 104 detects an obstacle in the long range, the buzzer is repeatedly turned on and off with 0.15-second intervals when the other detects an obstacle in the long range, as shown in (b) in FIG. 8; the buzzer is repeatedly turned on and off with 0.075-second intervals when the other detects an obstacle in the middle range, as shown in (c) in FIG. 8; and the buzzer is continuously turned on (or outputs a continuous sound) when the other detects an obstacle in the short range, as shown in (d) in FIG. 8. Further, In a case where one of the front-side sensor 101, 102 or the rear-side sensor 103, 104 detects an obstacle in the middle range, the buzzer is repeatedly turned on and off with 0.075-second intervals when the other detects an obstacle in the middle range, as shown in (c) in FIG. 8; and the buzzer is continuously turned on (or outputs a continuous sound) when the other detects an obstacle in the short range as shown in (d) in FIG. 8. Furthermore, in a case where one of the front-side sensor 101, 102 or the rear-side sensor 103, 104 detects an obstacle in the short range, the buzzer is continuously turned on (or outputs a continuous sound) when the other detects an obstacle in the short range, as shown in (d) in FIG. 8.

These warning patterns cannot detect that obstacles are present in both of the front side and the rear side, so that the vehicle has possibility of contacting whichever of the obstacles is closer to the vehicle. To avoid this, if all different warning patterns are prepared for all the combination when the both of the front-side sensor 101, 102 and the rear-side sensor 103, 104 detect obstacles, nine patterns must be prepared. However, it is not realistically favorable because, for an occupant of the vehicle, it is very burdensome to judge the warning patterns of no fewer than nine and thereby very difficult to properly determine the circumstance.

SUMMARY OF THE INVENTION

It is an object of the present invention to provide a vehicular obstacle detection system that enables, by using a single warning unit such as a buzzer, an occupant of a vehicle to easily recognize that obstacles are present in both the front side and the rear side of the vehicle.

To achieve the above object, an obstacle detection system in a vehicle is provided with the following. A first sensor is included for detecting which distance range an obstacle enters, of a plurality of distance ranges into which a detection zone is divided based on a distance from the vehicle, wherein the detection zone of the first sensor includes at least one of a zone facing a front side of the vehicle and a zone facing a front corner of the vehicle. A second sensor is included for detecting which distance range an obstacle enters, of a plurality of distance ranges into which a detection zone is divided based on a distance from the vehicle, wherein the detection zone of the second sensor includes at least one of a zone facing a rear side of the vehicle and a zone facing a rear corner of the vehicle. A single warning unit is included for warning an occupant of the vehicle. A first warning control unit is included for causing, in a single-sensor detection condition where only one of the two sensors detects an obstacle entering in the detection zone, the warning unit to warn by using the warning unit in a primary warning pattern prepared for each of the distance ranges, based on the distance range entered by the detected obstacle. A second warning control unit is included for causing, in a both-sensor detection condition where each of the two sensors detects an obstacle entering in the detection zone, the warning unit to warn by using the warning unit in a different warning pattern differentiated from the primary warning pattern in a certain case where at least one of the two sensors detects the obstacle entering a shortest distance range of the plurality of ranges, and in the primary warning pattern corresponding to the distance range entered by the obstacle that is closer to the vehicle of the obstacles detected by the two sensors in a given case except the certain case.

Namely, under this structure, in a single-sensor detection condition, the warning unit warns by using the single warning unit in a primary warning pattern that is prepared for each of the distance ranges based on the distance range entered by the detected obstacle. In contrast, in a both-sensor detection condition, the following two warning patterns take place. (i) In a certain case where at least one of the first sensor and the second sensor detects the obstacle in a shortest distance range, the warning unit warns by using the single warning unit in a different warning pattern differentiated from the primary warning pattern. (ii) In a given case except the certain case, the warning unit warns by using the single warning unit in the primary warning pattern corresponding to the distance range that is entered by the obstacle that is closer to the vehicle of the obstacles detected by the two sensors. The occupant of the vehicle is notified of the obstacles approaching and does not feel burdensome because the number of patterns different from the primary warning pattern is few. As a result, by using a signal warning unit, the occupant can be caused to recognize that obstacles are present in both the front side and the rear side of the vehicle.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
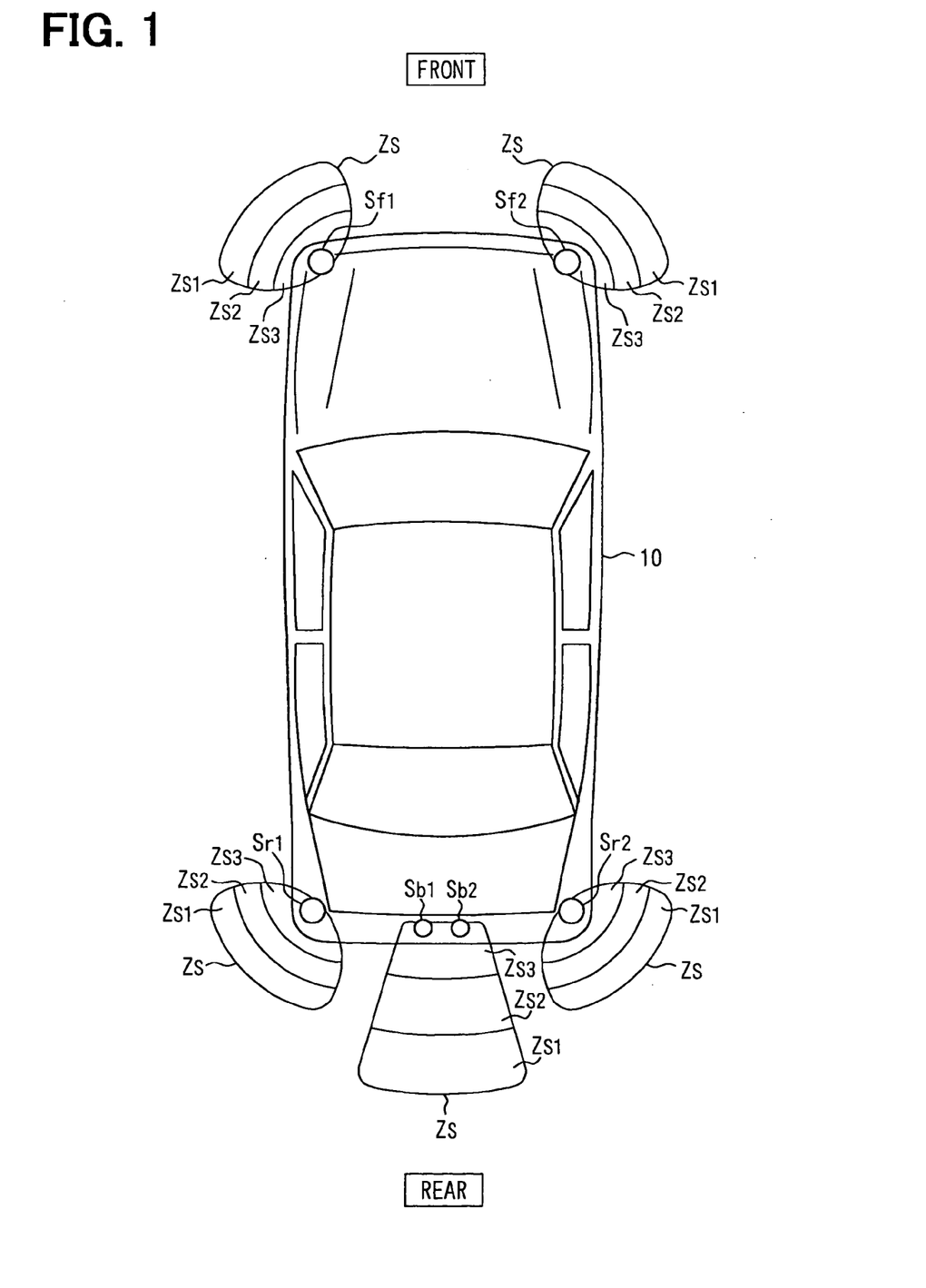
FIG. 1 is a layout diagram of sensors in a vehicular obstacle detection system according to an embodiment of the present invention.

A vehicular obstacle device according to an embodiment of the present invention will be explained with reference to the drawings. The obstacle detection system mounted in a vehicle 10 includes sensors, as shown in FIG. 1. In the front-side left corner of the vehicle 10 in FIG. 1, a sensor Sf1 is disposed for having a detection zone Zs covering a vicinity of the front-side left corner of the vehicle 10. Similarly, in the front-side right corner of the vehicle 10, a sensor Sf2 is disposed for having a detection zone Zs covering a vicinity of the front-side right corner of the vehicle 10. In the rear-side left corner of the vehicle 10, a sensor Sr1 is disposed for having a detection zone Zs covering a vicinity of the rear-side left corner of the vehicle 10. In the rear-side right corner of the vehicle 10, a sensor Sr2 is disposed for having a detection zone Zs covering a vicinity of the rear-side right corner of the vehicle 10. Further, in the rear side of the vehicle 10, back sensors Sb1, Sb2 are disposed for having in common a detection zone Zs covering a vicinity of the rear side of the vehicle 10.

Here, the detection zone Zs of each sensor Sf1, Sf2, Sr1, Sr2, Sb1, Sb2 includes three ranges Zs1, Zs2, Zs3 based on a distance, i.e., a long range Zs1, a middle range Zs2, and a short range Zs3.

As each sensor Sf1, Sf2, Sr1, Sr2, Sb1, Sb2, an ultra-sonic distance sensor (or sonar) can be adopted. When the sonar is adopted, covering ranges are as follows. With respect to the front-corner sonar Sf1, Sf2 and the rear-corner sonar Sr1, Sr2, a distance to an outer boundary of the long range Zs1, a distance to a boundary between the long range Zs1 and the middle range Zs2, and a distance to a boundary between the middle range Zs2 and the short range Zs3 are, for instance, 50 cm, 37.5 cm, and 25 cm, respectively. With respect to the back sonar Sb1, Sb2, the distances are, for instance, 150 cm, 100 cm, and 50 cm, respectively.

The respective sensors Sf1, Sf2, Sr1, Sr2, Sb1, Sb2 are grouped, so that the front-side sensors Sf1, Sf2 are designated as a first sensor while the rear-side sensors Sr1, Sr2, Sb1, Sb2 are designated as a second sensor. The first sensor including the sensors Sf1, Sf2 detects which range among the three ranges Zs1, Zs2, Zs3 of the detection zone Zs an obstacle enters when the obstacle approaching the front corners of the vehicle 10. The second sensor including the sensors Sr1, Sr2, Sb1, Sb2 detects which range among the three ranges Zs1, Zs2, Zs3 of the detection zone Zs an obstacle enters when the obstacle approaching either the rear corners or the rear side of the vehicle 10.

Figure 2:
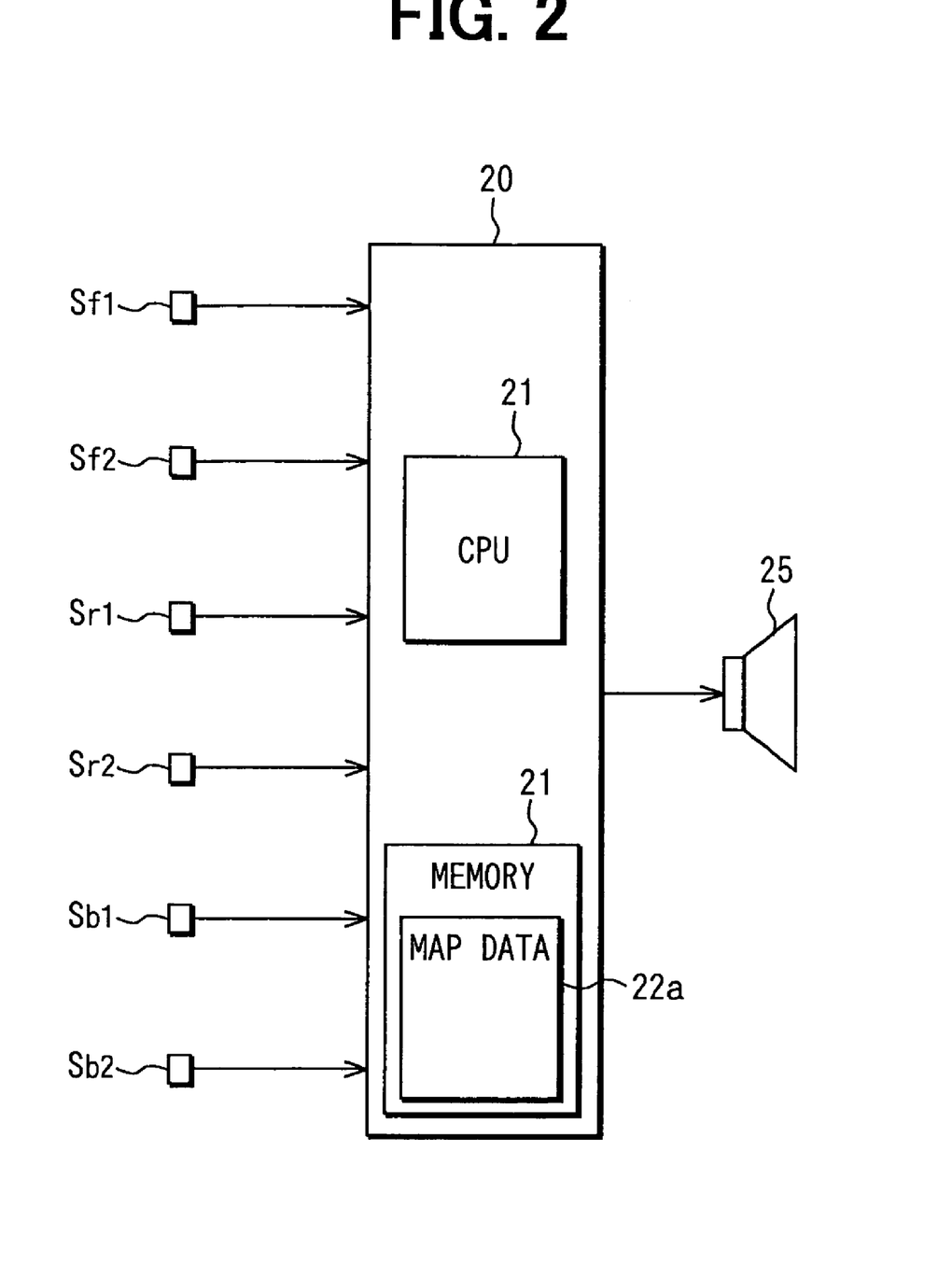
FIG. 2 is an electrical block diagram of the vehicle obstacle detection system according to the embodiment.
Figure 3:
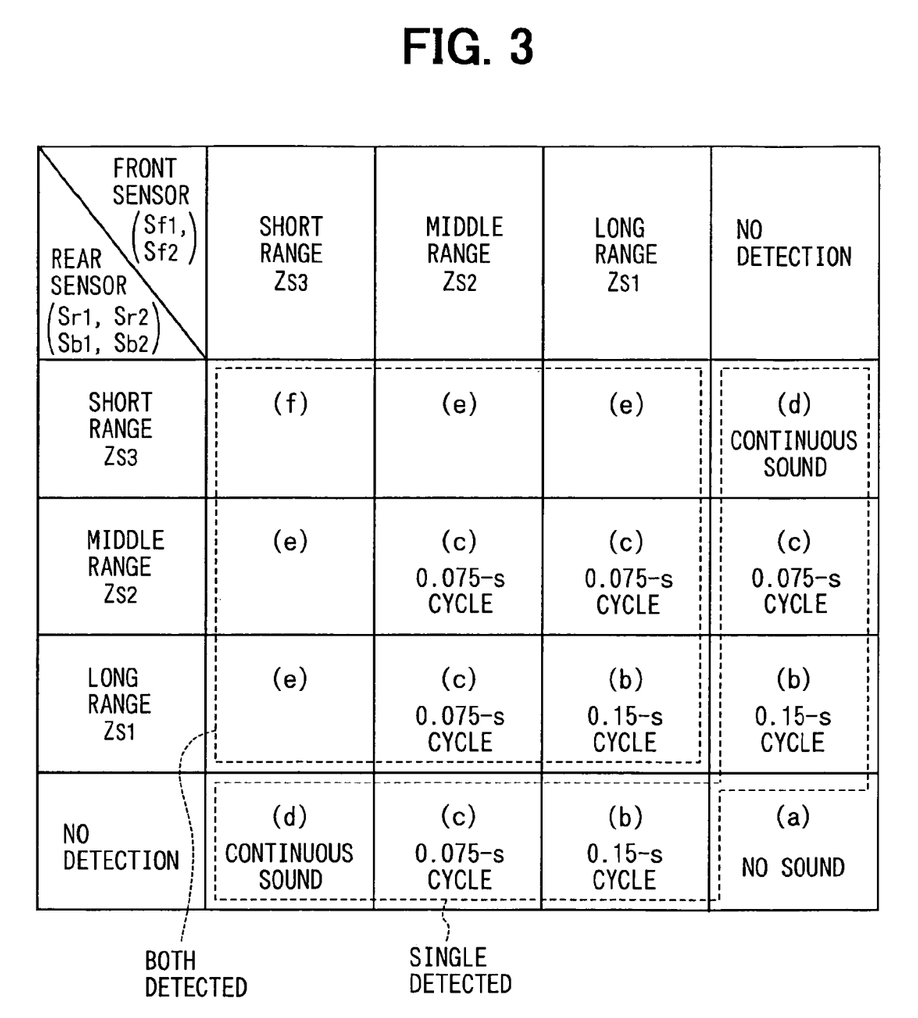
FIG. 3 is a diagram showing a combination of output patterns of a warning sound by a buzzer according to the embodiment.

The obstacle detection system further includes, in addition to the sensors Sf1, Sf2, Sr1, Sr2, Sb1, Sb2, a micro-computer 20 and a single buzzer 25 warning (or alarming) an occupant of the vehicle 10, as shown in FIG. 2. The micro-computer 20 interfaces with the sensors Sf1, Sf2, Sr1, Sr2, Sb1, Sb2 and the buzzer 25. The micro-computer 20 has a central processing unit (CPU) 21 and a memory 22 that stores map data 22a. The map data 22a includes data shown in FIG. 3 to show a combination of output patterns of warning sounds by the buzzer 25. The line of FIG. 3 shows each case where an obstacle is detected by the first sensor including the front-side sensors Sf1, Sf2 in the short range Zs3, in the middle range Zs2, or in the long range Zs1 of the detection zone Zs, or where no obstacle is detected. Similarly, the column shows each case where an obstacle is detected by the second sensor including the rear-side sensors Sr1, Sr2, Sb1, Sb2 in the short range Zs3, in the middle range Zs2, or in the long range Zs1 of the detection zone Zs, or where no obstacle is detected. The CPU 21 selects a warning pattern according to this map data, to then cause the buzzer 25 to output a warning sound.

Figure 4:
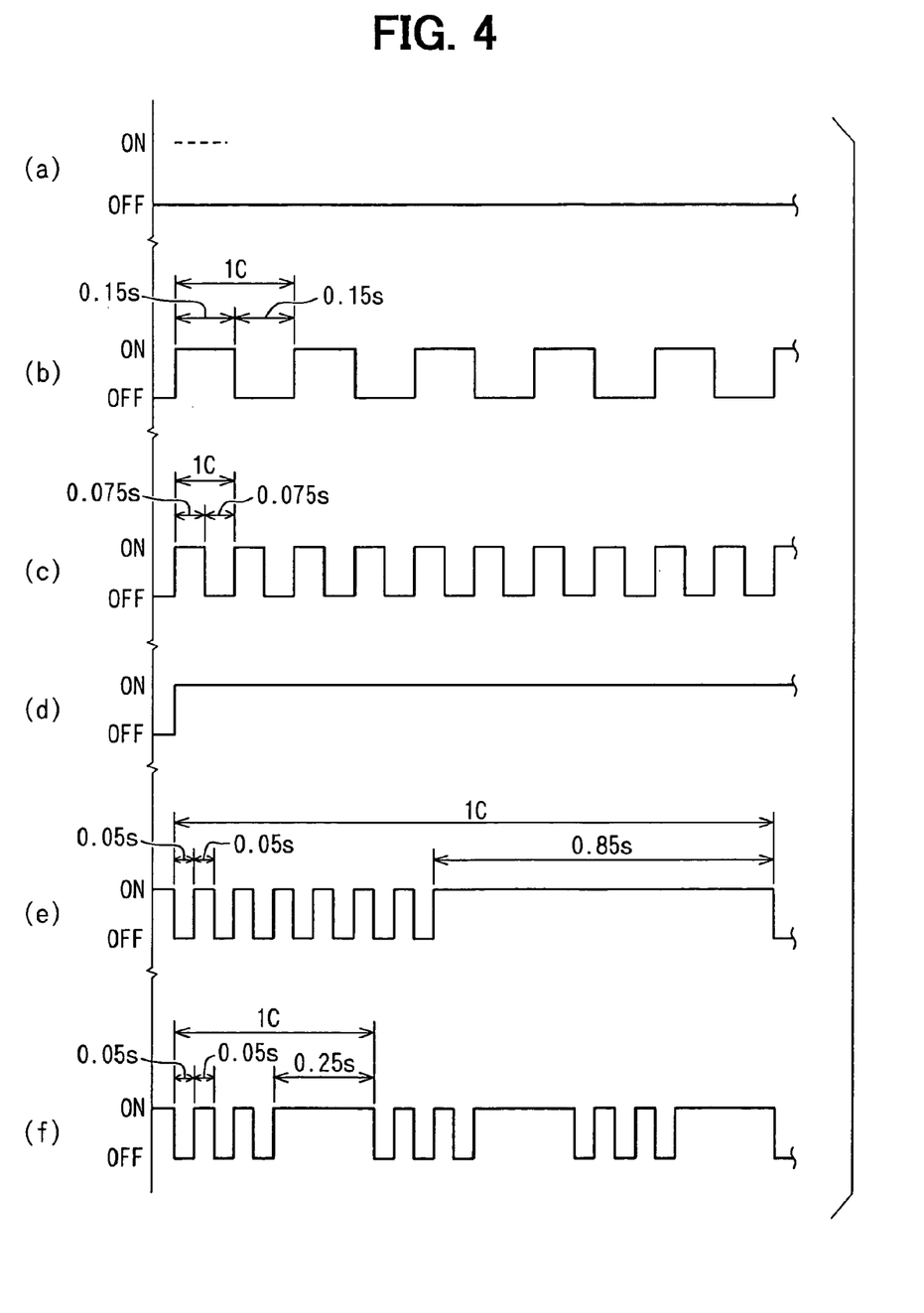
FIG. 4 is a time chart diagram showing a pattern of each warning sound used in the vehicle obstacle detection system according to the embodiment.

The warning sound is outputted using a warning pattern shown in the time chart (a) to (f) in FIG. 4. Here, the buzzer sound is outputted with a constant-frequency sound under an ON state in the warning patterns (a) to (f) in FIG. 4.

The CPU 21 of the micro-computer 20 controls activating the buzzer 25 by using any one of the warning patterns (a) to (f) in FIG. 4, according to the map data in FIG. 3, based on whether an obstacle is detected nor not by each sensor Sf1, Sf2, Sr1, Sr2, Sb1, Sb2.

The operation will be explained below in detail. First, when no sensors detect an obstacle, the buzzer 25 is caused to stop an output of the warning sound with an OFF state maintained, as shown in the pattern (a). Next, upon detecting an obstacle, the micro-computer 20 basically controls a warning sound in two controls of a first control, i.e., when only one of the first sensor and the second sensor detects an obstacle, and a second control, i.e., when both of the first sensor and the second sensor detect obstacles.

In the first control, when one of the first sensor (Sf1, Sf2) and the second sensor (Sr1, Sr2, Sb1, Sb2) detects an obstacle (or in a single-sensor detection condition), the micro micro-computer 20 causes the buzzer 25 to output a warning sound in a primary warning pattern including patterns (b), (c), (d) that will be explained below. (The pattern (a) in FIG. 4 can be also included in the primary warning pattern.) The primary warning pattern is varied based on which range of the three ranges Zs1, Zs2, Zs3 the detected obstacle is entering. In detail, when the obstacle is detected in the long range Zs1, the pattern (b) where the sound is outputted with switching between ON state and OFF state at 0.15-second intervals takes place. When the obstacle is detected in the middle range Zs2, the pattern (c) where the sound is outputted with switching between ON state and OFF state at 0.075-second intervals takes place. When the obstacle is detected in the short range Zs3, the pattern (d) where the sound is outputted with ON state continued as a continuous sound takes place.

In contrast, in the second control, when both of the first sensor (Sf1, Sf2) and the second sensor (Sr1, Sr2, Sb1, Sb2) detect obstacles (or in a both-sensor detection condition), the micro micro-computer 20 causes the buzzer 25 to output a warning sound as follows. Referring to FIG. 3, suppose the case where one of the first sensor and the second sensor detects an obstacle in the long range Zs1. In this case, when the other detects an obstacle in the long range Zs1, the pattern (b) where the sound is outputted with switching between ON state and OFF state at 0.15-second intervals takes place; when the other detects an obstacle in the middle range Zs2, the pattern (c) where the sound is outputted with switching between ON state and OFF state at 0.075-second intervals takes place; further, when the other detects an obstacle in the short range Zs3, the pattern (e) takes place. In the pattern (e), the sound is outputted such that an ON state is continued for 0.85 second after six repetitions of ON state and OFF state, both of which are switched to each other at 0.05-second intervals, to thereby form a cycle of 1.5 second that is to be repeated.

Further, in the second control, referring to FIG. 3, in the case where one of the first sensor and the second sensor detects an obstacle in the middle range Zs2 and the other detects an obstacle in the middle range Zs2, the pattern (c) where the sound is outputted with switching between ON state and OFF state at 0.075-second intervals takes place. Further, referring to FIG. 3, in the case where one of the first sensor and the second sensor detects an obstacle in the middle range Zs2 and the other detects an obstacle in the short range Zs3, the pattern (e) where the sound is outputted such that an ON state is continued for 0.85 second after six repetitions of ON state and OFF state, both of which are switched to each other at 0.05-second intervals, to thereby form a cycle of 1.5 second that is to be repeated.

Further, in the second control, referring to FIG. 3, in the case where one of the first sensor and the second sensor detects an obstacle in the short range Zs3 and the other also detects an obstacle in the short range Zs3, the pattern (f) takes place. In the pattern (f), the sound is outputted such that an ON state is continued for 0.25 second after two repetitions of ON state and OFF state, both of which are switched to each other at 0.05-second intervals, to thereby form a cycle of 0.50 second that is to be repeated.

Thus, in the second control or when both of the first sensor and the second sensor detect obstacles, the warning sound is outputted as follows. In a case where none of the two sensors detects the obstacles in the short range Zs3, the warning sound is outputted in the primary warning pattern (b), (c) based on the range entered by, of the obstacles detected by the two sensors, the obstacle that is closer to the vehicle. In contrast, in a case where at least one of the two sensors detects the obstacle in the short range Zs3, the warning sound is outputted in the different warning pattern (e), (f) in FIG. 4 that is differentiated from the primary warning pattern including patterns (a) to (d) in FIG. 4. Further, the different warning pattern is varied to the pattern (e) in FIG. 4 and the pattern (f) in FIG. 4. The patterns (e) (f) include within a cycle a combination of multiple discontinuous sounds and a continuous sound, and are different from each other in the output frequency of the discontinuous sounds and the period of the continuous sound. The pattern (f) has, within a cycle, the fewer output frequency and the shorter period of the subsequent continuous sound than the pattern (e). The pattern (f is used when both of the two sensors detect the obstacles in the short ranges Zs3, while the pattern (e) is used when only one of the two sensors detects the obstacle in the short ranges Zs3. These differences are favorable in an aspect of recognizing danger.

As explained above, this embodiment has the following features. Under the second control of the micro-computer 20, when both of the first sensor and the second sensor detect obstacles, the buzzer 25 outputs the warning sound (i) in the different warning pattern that is differentiated from the primary warning pattern, in a certain case where at least one of the two sensors detects the obstacle in the short range Zs3 closest to the vehicle 10, and (ii) in the primary warning pattern corresponding to the distance range that is entered by the obstacle that is closer to the vehicle, of the obstacles detected by the two sensors, in a case where none of the two sensors detect the obstacles in the short ranges Zs3, i.e., in a case except the certain case.

This enables an occupant of the vehicle 10 to be warned. Further, the number of different warning patterns is few, so that the occupant does not feel burdensome. As a result, the occupant is enabled to easily recognize that obstacles are present in both the front side and the rear side of the vehicle 10.

When an obstacle detection system shown in FIG. 7 is adopted, it is not simply recognized that obstacles are present or approaching in both the front side and the rear side of the vehicle 100. Therefore, the vehicle 100 possibly contacts the obstacle which is approaching closer to the vehicle in either the front side or the rear side. To avoid this problem, if unique patterns are prepared for all the combination when the both of the front-side sensor 101, 102 and the rear-side sensor 103, 104 detect obstacles, nine patterns must be prepared. However, it is very burdensome for an occupant of the vehicle to judge the warning patterns of no fewer than nine. Further, it is very difficult for the occupant to properly determine the circumstance. In contrast, in the obstacle detection system of this embodiment, as shown in FIG. 3, only two patterns (e), (f) are used for warning the occupant that obstacles are approaching the front side and the rear side, respectively, and that at least one of the obstacles is entering the short range, i.e., very close to the vehicle 10.

(Modification)

In this embodiment, the sensors Sf1, Sf2 are disposed in the front corners of the vehicle 10, the sensors Sr1, Sr2 are disposed in the rear corners of the vehicle 10, and the sensors Sb1, Sb2 are disposed in the rear side of the vehicle 10. However, sensors can be also differently disposed. For instance, only the sensors Sf1, Sf2, Sr1, Sr2 can be disposed.

Otherwise, a front sensor and a back sensor can be disposed in the front side and the rear side, respectively. Namely, a detection zone Zs of the first sensor only needs to cover at least one of the front side and the front corner, while the first sensor only needs to detect which range Zs1, Zs2, Zs3 of the detection zone Zs based on the distance to the vehicle 10 an obstacle enters. Further, a detection zone Zs of the second sensor only needs to cover at least one of the rear side and the rear corner, while the second sensor only needs to detect which range Zs1, Zs2, Zs3 of the detection zone Zs based on the distance to the vehicle 10 an obstacle enters.

In this embodiment, the detection zone Zs is divided into three ranges (long range Zs1, middle range Zs2, short range Zs3) based on a distance; however, it can be divided into two ranges or four or more ranges. In short, it only needs to be divided into multiple ranges based on a distance.

Further, the buzzer 25 can be replaced by an in-vehicle speaker, as a warning unit.

Further, the buzzer 25 as the warning unit can be replaced by a light emitting unit that emits light or by a unit that outputs light in addition to sound.

It will be obvious to those skilled in the art that various changes may be made in the above-described embodiments of the present invention. However, the scope of the present invention should be determined by the following claims.

What is claimed is:

1. An obstacle detection system provided in a vehicle, comprising:
    a first sensor that detects which distance range an obstacle enters, of a plurality of distance ranges into which a detection zone is divided based on a distance from the vehicle, wherein the detection zone of the first sensor includes at least one of a zone facing a front side of the vehicle and a zone facing a front corner of the vehicle;
    a second sensor that detects which distance range an obstacle enters, of a plurality of distance ranges into which a detection zone is divided based on a distance from the vehicle, wherein the detection zone of the second sensor includes at least one of a zone facing a rear side of the vehicle and a zone facing a rear corner of the vehicle;
    a single warning unit that warns an occupant of the vehicle;
    a first warning control unit that causes, in a single-sensor detection condition where only one of the two sensors detects an obstacle entering in the detection zone, the warning unit to warn by using the warning unit
        in a primary warning pattern prepared for each of the distance ranges, based on the distance range entered by the detected obstacle; and
    a second warning control unit that causes, in a both-sensor detection condition where each of the two sensors detects an obstacle entering in the detection zone, the warning unit to warn by using the warning unit
        in a different warning pattern differentiated from the primary warning pattern in a first both-sensor detection condition, wherein at least one of the two sensors detects the obstacle entering a shortest distance range of the plurality of ranges, and
        in the primary warning pattern corresponding to the distance range entered by the obstacle that is closer to the vehicle of the obstacles detected by the two sensors in a second both-sensor detection condition, wherein the second both-sensor detection condition is different from the first both-sensor detection condition.

2. An obstacle detection system of claim 1,
wherein the different warning pattern differentiated from the primary warning pattern is patterned by combining within a cycle a continuous sound and a discontinuous sound.

3. An obstacle detection system of claim 1,
wherein, when the second warning control unit causes the warning unit to warn in the different warning pattern in the first both-sensor detection condition, the different warning pattern in a third both-sensor detection condition and the different warning pattern in fourth both-sensor detection condition are different from each other,
wherein the third both-sensor detection condition is where each of the two sensors detects the obstacle entering the shortest range of the plurality of ranges, and
wherein the fourth both-sensor detection condition is different from the third both-sensor detection condition.

4. An obstacle detection system of claim 3,
wherein the different warning pattern is varied by, within a cycle, an output frequency of a discontinuous sound and a period of a continuous sound.

5. An obstacle detection system of claim 4,
wherein the different warning pattern in the third both-sensor detection condition is a second warning pattern and the different warning pattern in the fourth both-sensor detection condition is a first warning pattern, and
wherein the second warning pattern has, within a cycle, the fewer output frequency of the discontinuous sound and the shorter period of the continuous sound than the first warning pattern.

* * * * *